A. C. McWILLIAMS.
METERING PANEL BOARD.
APPLICATION FILED MAY 13, 1910.

1,061,195.

Patented May 6, 1913.
2 SHEETS—SHEET 2.

Witnesses:

Inventor
Arthur C. McWilliams
By Cheever & Cox
Attys.

UNITED STATES PATENT OFFICE.

ARTHUR C. McWILLIAMS, OF CHICAGO, ILLINOIS.

METERING PANEL-BOARD.

1,061,195.   Specification of Letters Patent.   Patented May 6, 1913.

Application filed May 13, 1910. Serial No. 561,142.

*To all whom it may concern:*

Be it known that I, ARTHUR C. McWILLIAMS, a citizen of the United States, residing at Chicago, in the county of Cook and State of Illinois, have invented a certain new and useful Improvement in Metering Panel-Boards, of which the following is a specification.

My invention relates to metering panel boards, and is similar in some respects to the invention shown in my copending application filed April 25, 1910, Serial Number 557,535. In the construction illustrated in that application, the circuit bars have a row of sockets into any one of which a bushing and fuse plug may be inserted for connecting to the underlying meter bar. In that construction the meter bars must be spaced as far apart as the centers of the sockets. In the present construction the bushings are slidably mounted upon the circuit bars, and may, therefore, be located at any point on the bar with the result that the meter bars may be placed much closer together. This economizes space, which is one of the objects of my invention. Furthermore, it prevents the removal of the bushing by an unauthorized person which is another object of the invention.

Another object is to provide advantageous means for connecting the circuit bar to the desired meter bar.

It is also an object of my invention to provide an improved form of connector whereby the circuit bars may be connected to the circuit wires.

I obtain my objects by the mechanism illustrated in the accompanying drawings, in which—

Figure 1:
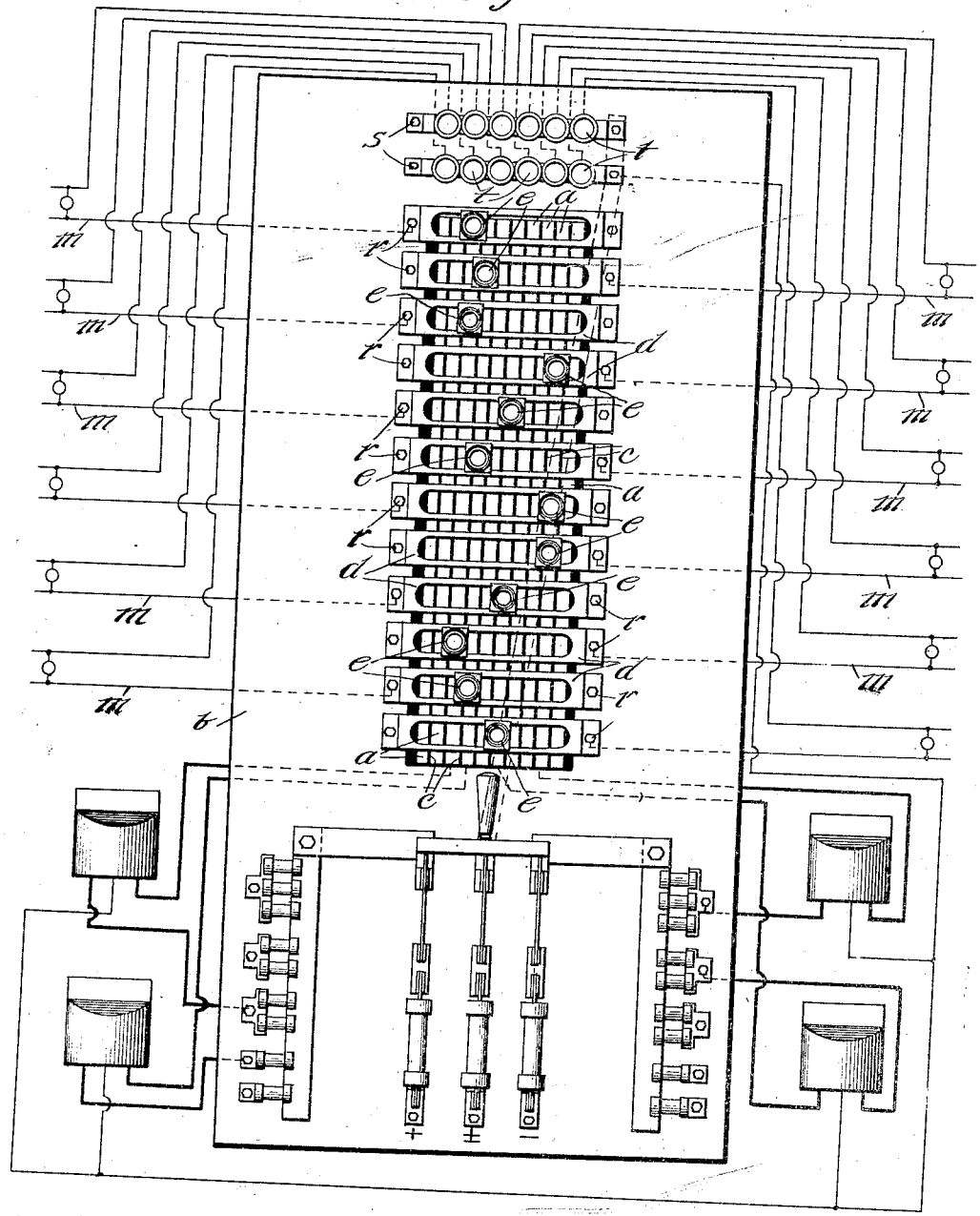
Figure 2:
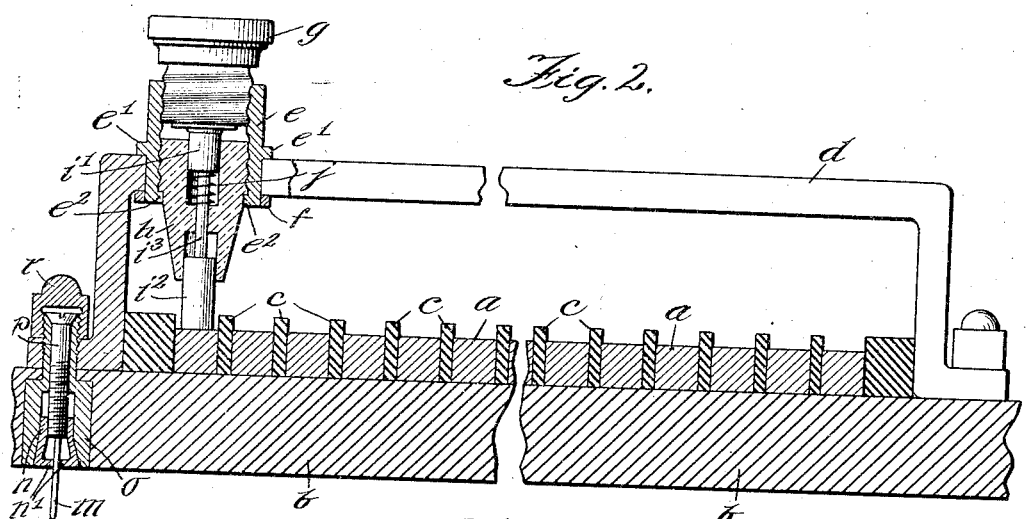
Figure 3:
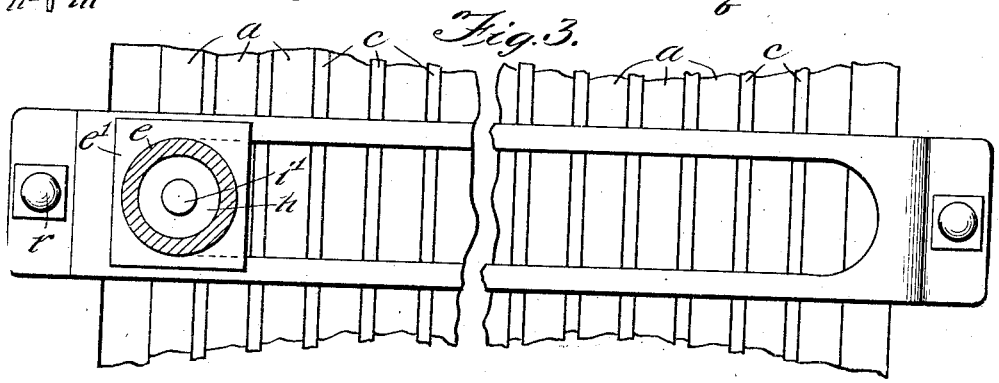
Figure 4:
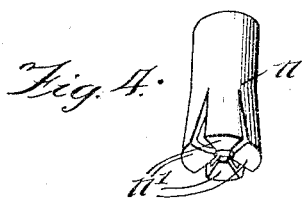
Figure 5:
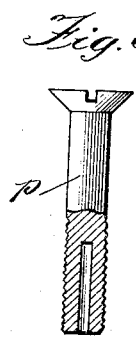
Figure 6:
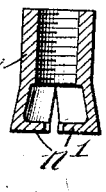

Figure 1 is a general view of the panel board showing the same connected up to meters and consumption circuits. Fig. 2 is a transverse sectional view of the apparatus. Fig. 3 is a plan view of the parts shown in Fig. 2. Figs. 4, 5 and 6 are views of component parts of the connector.

Similar reference characters denote similar parts throughout the several views.

In the form selected to illustrate the invention the meter bars $a$ are mounted parallel to each other upon the board $b$ and are separated by walls of insulation $c$, which preferably rise above the surface of bars $a$, as best shown in Fig. 2. When installed the meter bars are permanently connected to the respective meters in any suitable manner.

The circuit bars $d$ are mounted upon the board transverse to the meter bars and are elevated so as to stand some little distance above the top of the meter bars and insulating walls. The circuit bars are longitudinally slotted and slidingly support the bushings $e$, which are made of copper or other conducting material, and remain in electrical contact with the circuit bars when shifted to the different positions. By preference the bushings are held in position by means of integral flanges $e'$, which ride upon the top of the bar and rings $f$, which are pinned or otherwise rigidly secured to the lower end of the bushings and contact the under side of the bar. The bushings are internally threaded to receive fuse plugs $g$, which are of ordinary commercial construction, the outside of the plug being of conducting material and connected by a fuse to a central conducting bottom piece. As fuse plugs of this kind are well known in the art a detailed description is unnecessary.

Each bushing contains a block $h$ of porcelain, or other non-conducting material, said block being held in place preferably by means of an inwardly extending annular flange $e^2$ formed at the bottom of the bushing $e$. Block $h$ is recessed top and bottom to receive the upper and lower heads $i'$ and $i^2$ respectively of a connector, which consists of copper or other conducting material. Said heads $i'$ and $i^2$ are connected by a stem $i^3$, the parts being all vertically movable in block $h$. Said connector is normally held in raised position by means of a spring $j$ located between block $h$ and the under side of the upper head $i'$. The parts are so constructed that when the fuse plug is out the spring $j$ will hold the connector in raised position so that the lower head $i^2$ will clear the walls $c$ and permit the bushing to be shifted longitudinally of the circuit bar. When a plug is introduced and screwed down into the bushing it will force the connector downward and cause it to make electrical connection at the upper end with the center of the fuse plug and at the lower end with the underlying meter bar.

The preferred means for connecting a circuit bar to its respective circuit conductor is best shown in Figs. 2, 4, 5 and 6. The circuit wire $m$ is led up through the bottom of the split bushing $n$ which has fingers $n'$ at the bottom, the sides whereof are outwardly tapered so as to make a wedge fit in the correspondingly tapered bushing o. Bushing o is let into the back of the board and is screw threaded at its upper portion to screw into the foot of the circuit bar d. The split bushing n is internally threaded to engage the lower end of the bolt p, which passes down from the top of bushing o. These parts are all made of conducting material and the result is that when bolt p is tightened it will draw upward on the bushing n and cause the fingers n' to be crowded inward and securely engage the wire m. By preference a finished appearance is given to the connection by covering the same with a cap nut r. The remaining side of each consumption circuit is suitably connected to the source of supply, the arrangement here illustrated being the same as the one shown in my copending application above mentioned. Bus bars s are arranged across the top of the board and these are connected to the source of supply by suitable conductors. They are adapted to receive a number of fuse plugs t, which connect the bus bars to the different consumption circuits.

In operation, any given consumption circuit may be thrown onto any desired meter by first backing off or entirely removing the fuse plug from the circuit bar which is connected to the consumption circuit in question, and then shifting the bushing lengthwise on the bar until it overlies the proper meter bar. The connection is then established by merely screwing the plug into the bushing. On account of this construction in which the bushings are slidable to different positions or stations, said positions or stations may lie close together, it being unnecessary to space them as far apart as in my copending application. The result is that the meter bars may be located close together, in consequence of which a single circuit bar may extend across a great number of meter bars, thus affording a wide range of choice of meters for each circuit bar. The available space for metering panels is usually very restricted in office buildings and in other buildings where this kind of apparatus is used, and as my construction enables the complete apparatus to be brought into a very small compass it is of great advantage. Another advantage of my construction is that the bushing cannot readily be removed; also that there is no danger of connecting a given consumption circuit to more than one meter at a time for there is but a single bushing upon each circuit bar, and, therefore, only one fuse plug can be accommodated. It will be noted also that the circuit bars employed in this board are of very simple construction, and they are, therefore, cheaply and easily made and are not liable to get out of order.

Having thus described my invention, what I claim as new and desire to secure by Letters Patent is:—

1. In a metering panel board, a set of parallel permanent conductors, a permanent cross conductor, a slidable element mounted on said cross conductor and a connector for establishing electrical connection between said cross conductor and the desired one of said parallel conductors, said slidable element and said connector making interfitting screw connections with each other, and said slidable element being slidable to different positions upon said cross conductor to thereby remind the operator, after the adjustment has once been made, what particular conductor the connector should engage.

2. In a metering panel board, a set of parallel permanent conductors, a permanent cross conductor, a threaded bushing slidable upon said cross conductor, and a screw plug adapted to screw downward into said bushing to establish the connection between the cross conductor and the conductor beneath, the threads on the bushing and plug serving to increase the pressure of contact between the bar and the bushing to thereby increase the electrical efficiency of the connection.

3. In a metering panel board, the combination of a set of parallel meter bars, a circuit bar extending across them a slight distance away from them, an internally threaded socket bushing slidably mounted upon said circuit bar and electrically in contact therewith, a connector adapted to contact the meter bars, and means adapted to screw into said bushing for electrically connecting said connector to said bushing.

4. In a metering panel board, the combination of a set of parallel meter bars, a circuit bar extending across them a slight distance away from them, a bushing slidably mounted upon said circuit bar and electrically in contact therewith, a connector adapted to contact the meter bars, and a fuse plug screwing into said bushing for connecting it to said connector.

5. In apparatus of the class described, in combination, a set of parallel insulated bars, a transverse bar crossing above them, a normally raised connector longitudinally movable upon said transverse bar and means for holding said connector depressed to thereby establish electrical connection between said transverse bar and the selected one of said parallel bars.

6. In apparatus of the class described, in combination, a set of parallel insulated bars, a transverse bar crossing above them, a conducting bushing making sliding contact with said transverse bar, a normally raised conductor carried by said bushing, and a plug adapted to screw into said bushing for holding said connector depressed to thereby establish electrical connection between said transverse bar and the selected one of said parallel bars.

7. In apparatus of the class described, in combination, a set of parallel insulated bars, a transverse bar crossing above them, a conducting bushing making sliding contact with said transverse bar, an insulating block carried by said bushing, a normally raised connector carried by said block, and a fuse plug adapted to screw into said bushing for depressing said connector for the purpose described.

8. A metering panel board having crossed permanent conductors, the conductors running one way being for the meter circuits, and those running across them being for the consumption circuits, an internally threaded socket bushing, of conducting material adapted to slide upon and make contact with the consumption circuit conductor, and means screwing into said bushing for electrically connecting it to the adjacent meter conductor.

9. Apparatus of the class described comprising a bar of conducting material, a bushing of conducting material permanently secured to said bar and adapted to slide along it, a connector in said bushing, a set of conductors beneath said bar, and a fuse plug screwing into said bushing for contacting said connector and holding it in contact with the selected one of said conductors.

10. Apparatus of the class described comprising a slotted bar of conducting material, a bushing of conducting material permanently engaged within the slot of said bar and slidable along said bar, a set of conductors underlying said bar, and means for electrically connecting said bushing with the selected one of said conductors.

In witness whereof, I have hereunto subscribed my name in the presence of two witnesses.

ARTHUR C. McWILLIAMS.

Witnesses:
 HOWARD M. COX,
 MARGARET D. ROBB.